US012728300B2

(12) United States Patent
Shukla et al.

(10) Patent No.: US 12,728,300 B2
(45) Date of Patent: Sep. 8, 2026

(54) REUSABLE HEAD GEAR WITH REPLACEABLE MICROFILTER ASSEMBLIES POWERED AIR CIRCULATION, EARTHING AND COMMUNICATION PROTOCOL

(71) Applicants: Ashok Shukla, Noida (IN); Pushpa Rani Shukla, Noida (IN)

(72) Inventors: Ashok Shukla, Noida (IN); Pushpa Rani Shukla, Noida (IN)

(*) Notice: Subject to any disclaimer, the term of this patent is extended or adjusted under 35 U.S.C. 154(b) by 739 days.

(21) Appl. No.: 18/028,717

(22) PCT Filed: Sep. 27, 2021

(86) PCT No.: PCT/IN2021/050943

§ 371 (c)(1),
(2) Date: Mar. 27, 2023

(87) PCT Pub. No.: WO2022/064529

PCT Pub. Date: Mar. 31, 2022

(65) Prior Publication Data

US 2023/0363483 A1 Nov. 16, 2023

(30) Foreign Application Priority Data

Sep. 25, 2020 (IN) ............................ 202011041819

(51) Int. Cl.
*A62B 23/00* (2006.01)
*A42B 3/28* (2006.01)
(Continued)

(52) U.S. Cl.
CPC .............. *A62B 23/00* (2013.01); *A42B 3/286* (2013.01); *A42B 3/30* (2013.01); *A62B 18/045* (2013.01); *A62B 18/088* (2013.01)

(58) Field of Classification Search
CPC ..... A62B 23/00; A62B 18/045; A62B 18/088; A62B 18/00; A62B 17/04; A62B 18/003;
(Continued)

(56) References Cited

U.S. PATENT DOCUMENTS 3,413,972 A * 12/1968 Depping ............. A62B 18/045 128/201.23
3,525,334 A * 8/1970 Scott ................. A41D 13/0025 2/81
(Continued)

FOREIGN PATENT DOCUMENTS

CN 108601416 A * 9/2018 ............... A42B 3/30
CN 111685407 A * 9/2020 ............... A61L 9/18
(Continued)

OTHER PUBLICATIONS

English translation for JP 2013075157, machine translated by espacenet.com.*

(Continued)

*Primary Examiner* — Tu A Vo
(74) *Attorney, Agent, or Firm* — Jose Cherson Weissbrot

(57) ABSTRACT

The re-usable head gear (100) includes a fan and filter assembly (102), a replaceable multi-layered filter assembly (104), air leakage proof housing (106), a fan inlet (108) a strain gauge mechanism (112), a tube housing (114), a head band (116), a neck band (118), a low voltage wiring (120), a micro plug and socket assembly (122), an anti-static wire mesh tape (124), a customized hybrid microcircuit amplifier (128), external speakers (130), high clarity hi-fidelity dual speakers (132), and a microphone (134).

8 Claims, 2 Drawing Sheets

(51) Int. Cl.
*A42B 3/30* (2006.01)
*A62B 18/04* (2006.01)
*A62B 18/08* (2006.01)

(58) Field of Classification Search
CPC ....... A62B 18/006; A62B 18/04; A62B 18/08; A62B 7/00; A62B 9/00; A62B 17/00; A62B 17/001; A62B 17/006; A62B 17/08; A42B 3/30; A42B 3/286; A41D 13/1153; A41D 13/1218; A61F 9/068
See application file for complete search history.

(56) References Cited

U.S. PATENT DOCUMENTS

| | | | | | | |
|---|---|---|---|---|---|---|
| 3,562,813 | A | * | 2/1971 | Origer | A61F 9/029 | 2/5 |
| 3,911,914 | A | * | 10/1975 | Johansson | A62B 18/04 | 2/2.5 |
| 4,080,664 | A | * | 3/1978 | Morris | A61F 9/068 | 128/207.11 |
| 4,411,264 | A | * | 10/1983 | Jacobson | A62B 17/04 | 128/201.15 |
| 4,473,614 | A | * | 9/1984 | Hockmeyer | A62B 17/001 | 428/920 |
| 4,549,542 | A | * | 10/1985 | Chien | A62B 18/045 | D24/110.2 |
| 4,556,994 | A | * | 12/1985 | Kawasaki | A42B 3/288 | 2/909 |
| 4,683,880 | A | * | 8/1987 | Werjefelt | A62B 15/00 | 128/201.28 |
| 5,003,973 | A | * | 4/1991 | Ford | A42B 3/044 | 2/5 |
| 5,226,409 | A | * | 7/1993 | Bower | A62B 17/04 | 128/201.23 |
| 5,283,914 | A | * | 2/1994 | James | A42B 3/16 | 128/201.24 |
| 5,711,033 | A | * | 1/1998 | Green | F04D 17/16 | 2/424 |
| 5,758,639 | A | * | 6/1998 | Ikonen | A42B 3/28 | 128/201.25 |
| 5,819,728 | A | * | 10/1998 | Ritchie | A61M 16/06 | 128/201.25 |
| 5,886,667 | A | * | 3/1999 | Bondyopadhayay | H01Q 21/24 | 343/718 |
| 6,101,256 | A | * | 8/2000 | Steelman | A42B 3/30 | 381/376 |
| 6,374,823 | B1 | * | 4/2002 | Hajianpour | A62B 17/04 | 128/206.28 |
| 6,711,748 | B2 | * | 3/2004 | Paris | A41D 13/1209 | 2/422 |
| 6,826,783 | B1 | * | 12/2004 | Grove | A42B 3/10 | 128/201.25 |
| 9,636,527 | B2 | * | 5/2017 | Steger | A62B 18/045 | |
| 2003/0119459 | A1 | * | 6/2003 | Carillo, Jr. | H05K 9/002 | 455/271 |
| 2004/0216736 | A1 | * | 11/2004 | Lee | A62B 17/04 | 128/201.22 |
| 2005/0061317 | A1 | * | 3/2005 | King | A62B 17/04 | 128/201.22 |
| 2006/0048776 | A1 | * | 3/2006 | Cunningham | A42B 3/286 | 128/201.22 |
| 2007/0095344 | A1 | * | 5/2007 | Abernethy | A62B 17/006 | 128/201.22 |
| 2007/0277294 | A1 | * | 12/2007 | Green | A41D 13/1184 | 2/410 |
| 2008/0202509 | A1 | * | 8/2008 | Dillon | A42B 3/286 | 128/201.25 |
| 2009/0264073 | A1 | * | 10/2009 | Kushnirov | A42B 3/30 | 455/575.2 |
| 2018/0014597 | A1 | * | 1/2018 | Cooke | A42B 3/042 | |
| 2018/0235302 | A1 | * | 8/2018 | Weigen | A42B 3/044 | |
| 2020/0206544 | A1 | * | 7/2020 | Vaughan | A62B 17/04 | |
| 2020/0229530 | A1 | * | 7/2020 | Feher | A42B 3/286 | |
| 2020/0297044 | A1 | * | 9/2020 | Xie | A41D 13/0025 | |
| 2021/0275840 | A1 | * | 9/2021 | Conrad | B03C 3/08 | |
| 2021/0316168 | A1 | * | 10/2021 | Carroll | A62B 18/006 | |
| 2022/0016450 | A1 | * | 1/2022 | Hall | A42B 3/281 | |
| 2022/0016451 | A1 | * | 1/2022 | Hall | A62B 18/045 | |

FOREIGN PATENT DOCUMENTS

| | | | | | |
|---|---|---|---|---|---|
| GB | 2103043 | A | * | 2/1983 | A42B 3/303 |
| GB | 2553495 | A | * | 3/2018 | G01M 3/3218 |
| JP | 2013075157 | A | * | 4/2013 | A62B 18/006 |
| KR | 20150079372 | A | * | 7/2015 | H04R 1/10 |

OTHER PUBLICATIONS

English translation for CN 111685407, machine translated by espacenet.com.*

* cited by examiner

REUSABLE HEAD GEAR WITH REPLACEABLE MICROFILTER ASSEMBLIES POWERED AIR CIRCULATION, EARTHING AND COMMUNICATION PROTOCOL

FIELD OF THE INVENTION

The present disclosure relates to protective shields implemented with replaceable micro-filter assembly. More specifically, the present disclosure relates to a re-usable head gear implied with battery-powered anti-pathogenic micro-filter assembly to be implemented with a positive pressure air circulation with airflow sensors, microphone, and speakers for peer-to-peer communication along with earthing facilitation of electrostatic charge generated if any.

BACKGROUND

In recent past years, globalization has severely affected the environment, the ecosystem, and the natural resources. Over the past few decades, there has been a drastic rise in fatal and harmful bacterial, pathogenic, and microbial diseases due to urbanization.

The spread of COVID-19 has severely affected human health globally. In such conditions, the use of personal protective kits such as masks, face shields, gloves, goggles, headcovers, and others is of utmost importance to protect us from harmful viruses, bacterial pathogens, and other microbial diseases. PPE or Personal Protective Equipment plays a vital role in minimizing the spread of the COVID virus from one person to another.

In order to avoid contamination and spread of virus, several shields and wearables have been introduced in the market. Such shields and wearables include head shields, masks, gloves, PPE kits and the like. Furthermore, there are filters attached to the conventional shield and masks to protect a humans from harmful diseases. With the increase in need of PPEs by doctors, healthcare workers, frontline workers such as security guards, Police, army, and the general public the demand for PPE's has increased drastically thereby boosting the market size for the same. In present times, several different kinds of PPE's have filled in the market however those have limitations such as difficulty in breathing due to no circulation of fresh air, comfortability in wearing for prolonged hours, efficiency in restricting virus and chances of skin and other infections which the present PPE and other protective devices are not capable of. Moreover, there are also limitations with the efficiency of protection by conventional filters due to inefficient resistance to pathogenic loads and are susceptible to infections allowing the viral and bacterial transmission to the body including viruses and bacterial infections having the capability of transmission through skin besides nose and mouth.

Therefore, there is a dire need to overcome the limitations related to the conventional protective shields implemented with replaceable micro-filter assemblies.

SUMMARY OF THE INVENTION

In one aspect of the invention, a re-usable headgear (100) is provided. The re-usable headgear comprises: a fan and filter assembly (102) configured on the headgear (100) to encircle the ambient air in the entire headgear, a multilayered filter assembly (104) coupled to the fan and filter assembly (102), a fan inlet (108) connected to rechargeable battery backup configured to waist of personal protective equipment (PPE) kit, a strain gauge mechanism (112) (also referred to herein as microsensor for filter clogging indication) comprising a sensor situated just below fan inlet (108); a tube housing (114) to provide clear visibility, a head band (116) to keep the headgear (100) in place, a neck band (118) to seal the neck and prevent flow of incoming air, a filter (202) positioned above the neck band (118) to maintain net positive air pressure, a micro plug and socket assembly (122) positioned at the backside of the headgear (100), a microcircuit amplifier (128) to amplify the incoming and outgoing voice signals, a plurality dual speakers (132) to listen, external speakers (130) to communicate in person, and a microphone (134) for peer communication wirelessly.

In another aspect of the invention, the reusable headgear (100) further comprises a strain gauge mechanism (112) positioned below a fan inlet (108) of the head-gear (100) for measuring the entrained air flow entering inside the headgear (100) by a strain-gauge sensor. The strain gauge mechanism (112) compares the measured air flow with a pre-set air-flow value indicative of comfortable breathing level and alarming the user upon breach of the pre-set airflow value. The strain gauge sensor acts as a sensor/indicator to change the filter. There may be a microcontroller device on wrist or left hand of PPE Kit or mobile phone that can be displayed by several means to indicate the sensor.

In another aspect of the invention, the strain gauge mechanism (112) further consists of an electronic sensor to measure air flow that indicates clogging of filters.

In another aspect of the present disclosure, a low voltage wiring (120), associated with the head-gear (100) powers the multilayered filter assembly (104) and a fan motor assembly of the fan and filter assembly (102) is provided.

In yet another aspect of the present disclosure, a micro plug and socket assembly (122) of the head-gear (100) is electrically connected to a power-line wiring of a battery pack is provided.

In yet another aspect of the present disclosure, an anti-static wire mesh tape (124) of the head-gear (100) abstains the static charge accumulation on the head-gear (100) and the necessary air earthing of the head-gear (100) is provided. The air earthing through anti-static material like foams/films are formulated with varying ratio of impregnated metal particles to facilitate earthing of accumulated electrostatic charge through ambient humidity.

In yet another aspect of the present disclosure, pair of external speakers (130) positioned on either side of the head-gear (100), and a microphone (134) for enabling a peer-communication through each ear of the user is provided.

BRIEF DESCRIPTION OF DRAWINGS

The drawing/s mentioned herein disclose exemplary embodiments of the claimed invention. Other objects, features, and advantages of the present disclosure will be apparent from the following description when read with reference to the accompanying drawing.

To facilitate understanding, like reference numerals have been used, where possible to designate like elements common to the figures.

DETAILED DESCRIPTION OF PREFERRED EMBODIMENTS

This section is intended to provide explanation and description of various possible embodiments of the present disclosure. The embodiments used herein, and the various features and advantageous details thereof are explained more fully with reference to non-limiting embodiments illustrated in the accompanying drawing/s and detailed in the following description. The examples used herein are intended only to facilitate understanding of ways in which the embodiments may be practiced and to enable the person skilled in the art to practice the embodiments used herein. Also, the examples/embodiments described herein should not be construed as limiting the scope of the embodiments herein.

The words 'reusable headgear (100)' and 'headgear (100)' other such terms indicate the headgear and are used interchangeably.

The words "multilayered filter assembly (104)" and "replaceable multilayered assembly (104)" other such terms indicate the multilayered filter assembly (104) and are used interchangeably.

As mentioned, there is a need for the development of efficient headgear that would protect from the spread of diseases caused by harmful pathogens, bacteria, and viruses for much prolonged hours including the possibility of infection through touch and other ways besides areal or respiratory infections. The embodiment herein overcomes the limitations of the prior art by providing a reusable headgear implied with battery-powered anti-pathogenic to be implemented with positive pressure air circulation with airflow sensor for ease of breathing, peer communication device set & rechargeable battery backup & switch to draw in ambient air after filtration of pathogenic loads and harmful particles, in accordance with an embodiment of the present disclosure.

Figure 1:
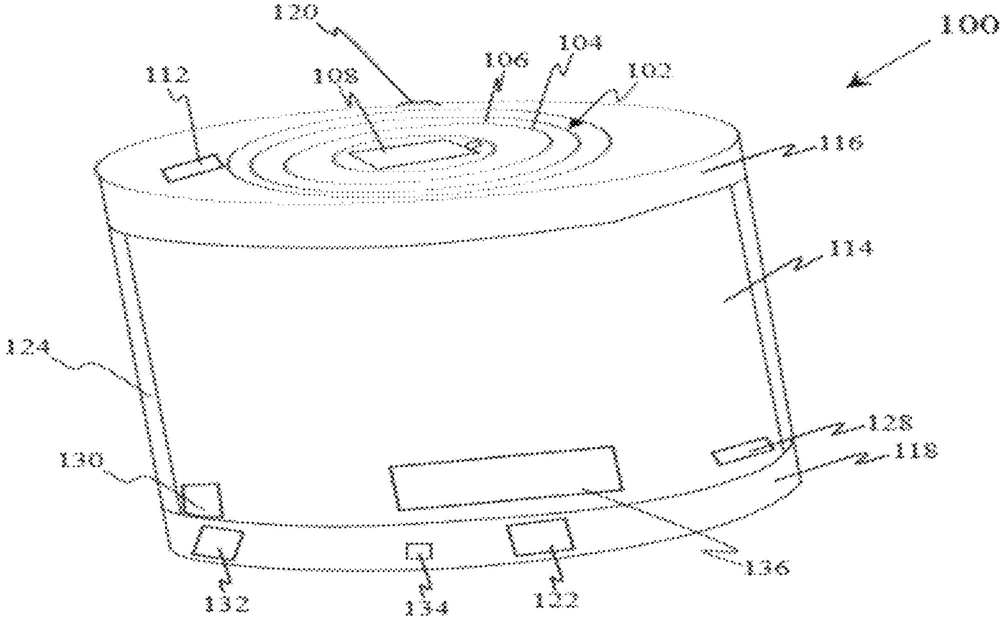
FIG. 1 illustrates a re-usable headgear (100) implied with battery powered anti-pathogenic to be implemented with positive pressure air circulation with air flow sensor for ease of breathing, peer communication device set & rechargeable battery backup & switch for the entire system to draw in ambient air after filtration of pathogenic loads and harmful particles, according to an embodiment herein. Switch is to be provided somewhere near battery backup.
Figure 2:
FIG. 2 illustrates a structural view of a re-usable head gear (100) of FIG. 1, according to an embodiment herein.

FIG. 1 illustrates a reusable headgear (100) according to the embodiments herein.

In one embodiment of the invention, a reusable headgear (100) includes a fan and filter assembly (102) to draw in ambient air at top of head gear, a strain gauge mechanism (112) to measure airflow, a tube housing (114) to provide clear visibility, a head band (116), a neck band (118), low voltage wiring (120), a micro plug and socket assembly (122), an anti-static wire mesh tape (124), a microcircuit amplifier (128), a pair external speakers (130), a dual speakers (132) and a microphone (134) is provided.

In another embodiment of the present invention, the fan and filter assembly (102) are present on the headgear. The fan and filter assembly (102) draws in the ambient air thereby acting as an air circulation device that circulates the ambient air inside the headgear. The fan and filter assembly (102) include a replaceable multilayered filter assembly (104) with air leakage proof housing (106), a fan, a strain gauge mechanism (112) positioned between the fan and the sixth layer of the filter, a fan inlet (108), and a press button (not shown). This Press Button is actually meant to be the on/off switch for the entire assembly of all the 3 parts, and to be put on the left arm. The headgear (100) comprises a fitment mechanism at the top of the headgear (100) that allows quick change of the multilayered filter assembly (104). The fan inlet (108) is a light plastic blade fan having low noise, long-running life and requires a low voltage. The fan inlet (108) comprises a micro motor which along with multilayered filter assembly (104) filters the air entrained by the fan into the kit, thereby eliminating any viral, bacterial, or other microorganisms or harmful particles, and maintains positive air pressure inside the headgear (100) and other parts assembled to it if required. The fan inlet (108) is further connected with a rechargeable battery backup configured to the waist of the personal protective equipment (PPE) kit.

In yet another embodiment of the present invention, the fan, strain gage sensor (not shown) and fan and filter assembly (102) are present at the top of the headgear (100). In yet another embodiment, the fan, strain gage sensor and filter assembly (102) are present at the bottom of the headgear (100). In yet another embodiment, the fan, strain gage sensor and filter assembly (102) are present at the right side of the headgear (100). In yet another embodiment, the fan, strain gage sensor and filter assembly (102) are present at the left side of the headgear (100). In yet another embodiment, the fan, strain gage sensor and filter assembly (102) are present at the backside of the headgear (100).

In yet another embodiment, the multilayered filter assembly (104) is provided. In yet another embodiment, the multilayered filter assembly (104) is selected but not limited to three, four, five, six, seven, eight layers. In yet another embodiment, the multilayered filter assembly (104) is replaceable. In yet another embodiment, the multilayered filter assembly (104) is removable. In yet another embodiment, the fan inlet (108) is made of a plastic. In yet another embodiment, the fan inlet (108) is made of a biodegradable plastic. In yet another embodiment, the fan inlet (108) is made of a bagasse. In yet another embodiment, the fan inlet (108) is made of a paper. In yet another embodiment, the fan inlet (108) is made of a bioplastic. In yet another embodiment, the fan inlet (108) is made of a steel. In yet another embodiment, the fan inlet (108) is made of an aluminum. In yet another embodiment, the fan inlet (108) blade is circular in shape. In yet another embodiment, the fan inlet (108) blade is oval. In yet another embodiment, the fan inlet (108) blade is rectangular. In yet another embodiment, the fan inlet (108) blade is square. In yet another embodiment, the fan inlet (108) blade is a trapezium. In yet another embodiment, the fan inlet (108) blade is cuboid. In yet another embodiment, the fan inlet (108) blade is triangular. In yet another embodiment, the fan inlet (108) blades are two in number. In yet another embodiment, the fan inlet (108) blades are three in number. In yet another embodiment, the fan inlet (108) blades are four in number. In yet another embodiment, the fan inlet (108) blades are five in number. In yet another embodiment, the fan inlet (108) blades are six in number. In yet another embodiment, the fan inlet (108) blades are seven in number. In yet another embodiment, the fan inlet (108) blades are eight in number. In yet another embodiment, the fan inlet (108) blades are nine in number.

In yet another embodiment, the headgear (100) comprises a multilayered filter assembly (104) that is removably coupled to the top of a fan. The strain gage sensor is positioned between the fan and the sixth layer of the filter. The fan and filter assembly (102) provides clean and sanitized air into the headgear (100). The micro sensor and fan and filter assembly (102) are configured to entrain the ambient air inside the head-gear (100) where the multilayered filter assembly (104) enables filtering of the entrained ambient air inside the head-gear (100). The fan and filter assembly (102) maintain a pre-determined air pressure inside the headgear (100).

The reusable headgear (100) also includes a strain gauge mechanism (112) having an electronic sensor situated just above the fan inlet (108) and below the filter assembly. The sensor measures the flow of air and sends the signal to the electronic device. A microprocessor-based system, situated on the arm enables comparison of the received signal corresponding to the flow of air with pre-defined values of the flow of air for indicating comfortable breathing. In case of depletion, the indicator alarm is activated that indicates the clogging of any of the filter layers. Alternately, it may also indicate clogging of all filter layers. Based on the clogging in the multiple filter layers, one or more filter layers can be replaced individually. The filters as a whole can also be replaced based on the extent of clogging and users' choice. A manual switch is placed on the arm of the accessory attached to it just below the indicator alarm and also it can be paced just below indicator alarm on the head gear itself depending upon whether head gear independent design or to be coupled with other accessories which is used to bypass or switch off the alarm. The strain gauge mechanism (112) is further connected to a micro-processor based circuit present within an electronic device where the output is displayed for the user. In yet another embodiment, the electronic device is selected but not limited to a wristwatch, a smart phone, a computer, a laptop, a tablet, an e-reader, a recorder, a smart watch, a navigator, a camera. In yet another embodiment, the output is selected but not limited to a light, a sound, a music, a vibration, a graphical representation. In yet another embodiment, the manual switch is selected and not limited to a rocker switch, a push button switch, a toggle switch, a flow switch, a pressure switch, a limit switch, a float switch, a rotary switch, a joystick switch, a double pole double throw switch, a double pole single throw switch, a single pole double throw switch, a single pole single throw switch, a slide switch.

In yet another embodiment, the electronic sensor measures an airflow rate. In yet another embodiment, the electronic sensor, measures a temperature of incoming air. In yet another embodiment, the electronic sensor, measures a temperature of outgoing air. In yet another embodiment, the electronic sensor measures the flow of air circulation inside the head gear. In yet another embodiment, the clogging alarm is a bell alarm. In yet another embodiment, the clogging alarm is a LED light. In yet another embodiment, the clogging alarm is an electric alarm. In yet another embodiment, the clogging alarm is a musical alarm. In yet another embodiment, the clogging alarm is a customized alarm.

Further, the headgear (100) consists of a tube housing (114) having a bi-oriented anti-static crystalized polyester bur and flow mark eliminated laser finished tube. The tube provides a flat viewing portion for clear visibility and eliminates visibility deformation and angular irregularities. In yet another embodiment, the tube housing (114) acts as a transparent screen for holographic projections to help as a visual aid. In yet another embodiment, in yet another embodiment, the housing may be a molded one in part or full in special shape for clear visibility with the portion in front of the face including eyes made of clear unbreakable plastic made of one or more materials out of laser and diamond finished mold with high transparency materials of polymers inclusive of but not limited to like various derivatives Polyester, polyolefin, a polyester, a polyamide, a fluoropolymer crystal, SAN, Poly Carbonate. In yet another embodiment the tube housing acts (114) as a face shield for protection. In yet another embodiment, the anti-static agents are selected but not limited to a polyolefin, a polyester, a polyamide, a fluoropolymer, a carbon, a phosphate, a quaternary amine, an ethylene oxide, an propylene oxide, a di-octyl sulfosuccinate potassium salt. In yet another embodiment the tube housing (114) is a molded housing.

The re-usable head gear (100) also includes ahead band (116). The 4-layered head band (116) is composed of semi rigid ethyl vinyl acetate, neoprene rubber, reticulated polyester foam & cotton fabric wherein the cotton fabric touches the human skin, the cushion formed of reticulate polyester foam allows adjustment as per head shape, the semi rigid CEVA foam provides rigidity to the layers and the rubber foam keeps the shape of the head gear (100) intact thereby preventing any deformation. The head band (116) also includes an extra high bond water proof tape which is patented along with air sealing tape. After assembling the entire PPE kit, the sealings are to be secured post adjustment by the wearer. In yet another embodiment, the fabric used in head band (116) is selected but not limited to a cotton, a chiffon, a silk, a crepe, a denim, a lace, a leather, a linen, a satin and a synthetic. In yet another embodiment, the rubber used in headband is selected but not limited to a neoprene rubber, a natural rubber, a silicone rubber, a nitrile rubber, an EPDM rubber, a styrene-butadiene rubber, a butyl rubber, a fluorosilicone rubber.

The reusable head gear (100) also includes a neck band (118) which comprises of 4 layers. The 4 layers are composed of semi rigid ethyl vinyl acetate, neoprene rubber, reticulated polyester foam & cotton fabric. The cotton fabric provides comfortable neck sealing and acts as a seal to eliminate outer air infiltration. The cotton fabric touches the human skin, the cushion formed of reticulate polyester foam allows adjustment as per head shape, the semi-rigid CEVA foam provides rigidity to the layers and the rubber foam keeps the shape of the headgear (100) intact thereby preventing any deformation. The neck band (118) also includes an extra high bond water fluid which is patented along with ai sealing tape. After assembling the entire PPE kit, the sealings are to be secured post-adjustment by the wearer. In yet another embodiment, the fabric used in the headband is selected but not limited to a cotton, a chiffon, a silk, a crepe, a denim, a lace, a leather, a linen, a satin and a synthetic. In yet another embodiment, the rubber used in headband is selected but not limited to a neoprene rubber, a natural rubber, a silicone, rubber, a nitrile rubber, an EPDM rubber, a styrene-butadiene rubber, a butyl rubber, a fluorosilicone rubber.

The reusable headgear (100) further includes a filter (202). The filter (202) is present just above the neck band (118) which is composed of flexible, medical grade, dampened fibers up to 3 layers at the bottom of the head gears to maintain positive net pressure inside the head gear when worn independently. This part will remain in an open position when the head gear is worn in assembled form with PPE Kit. These fibers allow the high-pressure air present inside the head gear to be released into the environment slowly thereby maintaining positive net pressure inside the head gear (100). In yet another embodiment, the fibers used in the filter (202) is selected but not limited to a silicone, a plastic, a urethane, a nylon, a cotton, a rayon, a Poly vinyl chloride, a poly butylene Terephthalate, a polypropylene, a polyethylene, a polyetheretherketnoe, a polyurethane, a polyurethane foam, a high-density foam, a charcoal foam, a latex foam, a lux foam, a memory foam, a closed cell foam, a high resilience foam, a rebond foam, a silk, a cotton, a polyester, a polyester blend, a quilting fabric, a plurality of cotton sheets, an absorbant cotton batting, an armure, a baft, a bengaline cotton, a batiste, a cambric.

The reusable head gear (100) also comprises a low voltage wiring (120) situated at the back side of the headgear (100). The low voltage wiring powers (120) the filter and fan motor assembly.

A micro plug and socket assembly (122) are included in the headgear (100). It connects the power line through the PPE kit and is wired to the battery pack belted at the waist of the PPE kit.

The re-usable headgear (100) also includes an anti-static wire mesh tape (124) that connects the wire assembly which further needs to be plugged into the earthing strips safely. The anti-static wire mesh tape (124) ensures the safety of the wearer from any loose charge or accumulation of anti-static charges. In an example, the anti-static wire mesh tape (124) may also ensure the safety of the wearer while using any medical equipment's for treating patients. In yet another embodiment, the anti-static wire mesh tape (124) is a paper tape. In yet another embodiment, the anti-static wire mesh tape (124) is a cross filament tape. In yet another embodiment, the anti-static wire mesh tape (124) is a glass fiber protection tape. In yet another embodiment, the anti-static wire mesh tape (124) is a self-adhesive screen repair tape. In yet another embodiment, the anti-static wire mesh tape (124) is a dry wall plastering tape. In yet another embodiment, the anti-static wire mesh tape (124) is an anti-crack waterproof tape. In yet another embodiment, the anti-static wire mesh tape (124) is a cloth tape. In yet another embodiment, the anti-static wire mesh tape (124) is a decorative tape. In yet another embodiment, the anti-static wire mesh tape (124) is a double-sided tape. In yet another embodiment, the anti-static wire mesh tape (124) is a magnetic tape. In yet another embodiment, the anti-static wire mesh tape (124) is a masking tape. In yet another embodiment, the anti-static wire mesh tape (124) is an electrical tape. In yet another embodiment, the anti-static wire mesh tape (124) is a duct tape. In yet another embodiment, the anti-static wire mesh tape (124) is a mounting tape. In yet another embodiment, the anti-static wire mesh tape (124) is a packaging tape.

The reusable headgear (100) also includes a customized hybrid microcircuit amplifier (128). The amplifier amplifies the incoming and outgoing voice signals making peer communication easy. The customized hybrid microcircuit amplifier (128) also allows the setting frequency of oscillation and the frequency of amplifier for the alarm indication in case of filter clogging. In yet another embodiment, the hybrid microcircuit amplifier (128) is an integrated circuit. In yet another embodiment, the hybrid microcircuit amplifier (128) is an amplifier. In yet another embodiment, the hybrid microcircuit amplifier (128) is a hybrid coil. In another embodiment, the hybrid microcircuit amplifier (128) is an audio amplifier. In another embodiment, the hybrid microcircuit amplifier (128) is a transistor.

The reusable head gear (100) also includes external speakers (130) for peer communication in person. In an embodiment, the reusable head gear (100) can include dual speakers (132) for peer communication. The external speakers (130) eliminates the difficulty of speaking and hearing through the sealed headgear (100). In an embodiment, the communication protocol based system through proper communication system integrated within the amplifier circuit receives and transmits remote signals to and from the senior or instructor and the external speakers (130) and dual speakers (132) are adapted and connected through amplifier circuit to receive and transmit instructions and feedback with peers, seniors as well as from a medical staff or rescue team remotely. In yet another embodiment, the external speakers (130) are selected but not limited to a custom nose plug, an earmuff, a reusable nose plug, a disposable nose plug, a custom sleep ear plugs, a moldable earplug. In yet another embodiment the dual speakers (132) is selected but not limited to a 23 mm PCB Mount Speaker, 15 mm Micro Speaker with Lead wires, a 20 mm Mylar Speaker with lead wires, a 20 mm Mylar Micro Speaker with Lead wires, a 18 mm micro speaker, a 23 mm PCB mount speaker.

The re-usable headgear (100) also includes a high-efficiency microphone (134) provided for peer communication because direct speaking or hearing through sealed headgear may be difficult. In yet another embodiment, the microphone (134) is a moving-coil dynamic microphone. In yet another embodiment, the microphone (134) is a passive ribbon dynamic microphone. In yet another embodiment, the microphone (134) is an active ribbon dynamic microphone. In yet another embodiment, the microphone (134) is a small diaphragm is a condenser microphone. In yet another embodiment, the microphone (134) is a large-diaphragm condenser microphone. In yet another embodiment, the microphone (134) is a true condenser microphone. In yet another embodiment, the microphone (134) is a tube condenser microphone.

We claim:

1. A reusable headgear (100), the headgear comprising:

a) a fan and filter assembly (102) configured to encircle an ambient air in the entire headgear, wherein the fan and filter assembly (102) comprising a multilayered filter assembly (104);

b) a fan inlet (108) connected to a rechargeable battery and configured to be disposed on a waist of a user;

c) a strain gauge mechanism (112) comprising a sensor situated below the multilayered filter assembly (104);

d) a tube housing (114) configured to provide clear visibility;

e) a head band (116) configured to keep the headgear (100) in place;

f) a neck band (118) configured to seal the neck and prevent flow of incoming air;

g) a filter (202) positioned above the neck band (118) and configured to maintain net positive air pressure;

h) a micro plug and socket assembly (122) positioned at a backside of the headgear (100);

i) a microcircuit amplifier (128) configured to amplify incoming and outgoing voice signals;

j) a plurality of external speakers (130);

k) a pair of dual speakers (132);

l) a microphone (134) for peer communication;

m) a foamed earthing cover with metal impregnation, configured to provide aerial earthing for earthing of electrostatic charges through moist air; and n) a micro plug to connect an anti-static wire mesh tape (124), wherein the anti-static wire mesh tape (124) is configured to ground anti-static charges.

2. The reusable headgear (100) of claim 1, wherein a strain gauge mechanism (112) positioned above the fan inlet (108) to receive an air flow and measure the incoming air pressure from the multilayered filter assembly (104) of the headgear (100) for measuring an entrained air flow entering inside the head gear (100) by the sensor.

3. The reusable headgear (100) of claim 2, wherein the strain gauge mechanism further comprising of an electronic sensor to measure air flow that indicates clogging of the multilayered filter assembly (104).

4. The reusable headgear (100) of claim 3, wherein the strain gauge mechanism (112) provides signal corresponding to the measured air flow and a microprocessor configured to alert the user upon breach of pre-defined threshold values for breathing corresponding to the air flow.

5. The reusable headgear (100) of claim 1, wherein the micro plug and socket assembly (122) of the headgear (100) is configured to connect to the rechargeable battery.

6. The reusable headgear (100) of claim 1, wherein the anti-static wire mesh tape (124) of the headgear (100) is configured to abstain static charge accumulation on the headgear (100) with an air earthing.

7. The reusable headgear (100) of claim 1, wherein the filter (202) is positioned above the neck band (118) is composed of dampened, medical grade fiber comprising one of silicone, plastic, urethane or a combination thereof, to maintain the net positive air pressure inside the headgear (100).

8. The reusable headgear (100) of claim 1, wherein the plurality of external speakers (130) positioned on either side of the headgear (100), the dual speakers (132) and the microphone (134) for enabling a peer-communication through each ear of the user.

* * * * *